(12) United States Patent
Kusano et al.

(10) Patent No.: US 10,705,680 B2
(45) Date of Patent: Jul. 7, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Nobumi Kusano, Kanagawa (JP); Ichiro Shiozaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 237 days.

(21) Appl. No.: 15/485,541

(22) Filed: Apr. 12, 2017

(65) Prior Publication Data
US 2018/0088779 A1    Mar. 29, 2018

(30) Foreign Application Priority Data

Sep. 26, 2016   (JP) .................................. 2016-186521

(51) Int. Cl.
| | |
|---|---|
| *G06F 3/0481* | (2013.01) |
| *G06F 3/0488* | (2013.01) |
| *G06F 3/0482* | (2013.01) |
| *G06F 3/0484* | (2013.01) |
| *G06F 9/451* | (2018.01) |
| *H04N 1/00* | (2006.01) |

(52) U.S. Cl.
CPC ........ *G06F 3/04817* (2013.01); *G06F 3/0482* (2013.01); *G06F 3/04847* (2013.01); *G06F 3/04886* (2013.01); *G06F 9/451* (2018.02); *H04N 1/00517* (2013.01)

(58) Field of Classification Search
CPC ............... G06F 3/04817; G06F 3/0482; G06F 3/04847; G06F 3/04886; G06F 9/451; H04N 1/00501
See application file for complete search history.

(56) References Cited

U.S. PATENT DOCUMENTS

| | | | |
|---|---|---|---|
| 6,046,739 A | 4/2000 | MacPhail | |
| 2002/0054146 A1 | 5/2002 | Fukumoto et al. | |
| 2010/0217751 A1* | 8/2010 | Ciubotaru ......... | G06F 17/30117 707/650 |
| 2011/0087981 A1* | 4/2011 | Jeong .................. | G06F 3/04817 715/765 |
| 2011/0209077 A1 | 8/2011 | Matsuura et al. | |
| 2013/0050731 A1* | 2/2013 | Fukuoh ................ | G06F 3/1258 358/1.13 |

(Continued)

FOREIGN PATENT DOCUMENTS

| | | |
|---|---|---|
| JP | H09-305360 A | 11/1997 |
| JP | H10-333797 A | 12/1998 |
| JP | 2011-168031 A | 9/2011 |

*Primary Examiner* — Jennifer N To
*Assistant Examiner* — Reji Kartholy
(74) *Attorney, Agent, or Firm* — Oliff PLC

(57) ABSTRACT

An information processing apparatus includes a display, an instruction receiving unit, and a controller. The display displays a screen containing a fundamental icon and an associated icon. The fundamental icon is an icon for selecting execution of a certain function. The associated icon is associated with the fundamental icon. The instruction receiving unit receives an instruction to delete an icon displayed on the screen by the display. The controller exerts control in such a manner that, when the icon is the fundamental icon, the instruction receiving unit does not delete the fundamental icon.

6 Claims, 23 Drawing Sheets

(56) References Cited

U.S. PATENT DOCUMENTS

| | | | |
|---|---|---|---|
| 2013/0074008 A1* | 3/2013 | Umezawa | G03G 15/502 715/810 |
| 2015/0160829 A1* | 6/2015 | Du | G06F 3/04817 715/765 |
| 2016/0239200 A1* | 8/2016 | Fang | G06F 3/04883 |
| 2017/0083711 A1* | 3/2017 | Hemaraj | G06F 3/0488 |

* cited by examiner

FIG. 12A
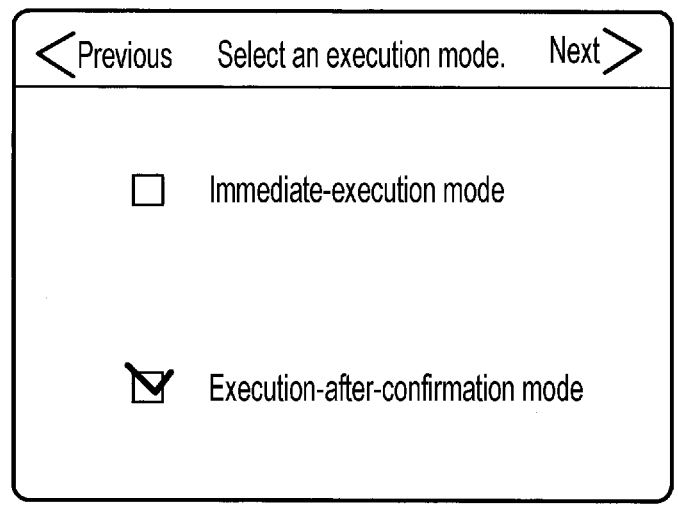
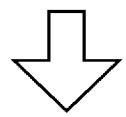
FIG. 12B
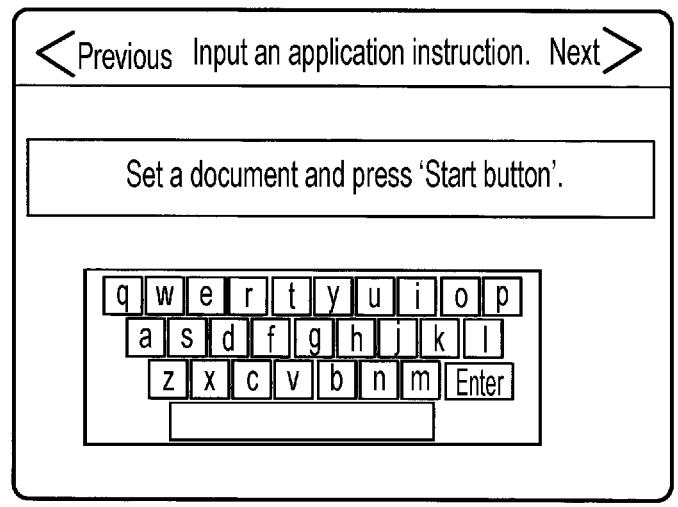

FIG. 19

| OPERATION | DELETE | HIDE |
|---|---|---|
| FUNDAMENTAL ICON | DISABLED | ENABLED |
| ONE-TOUCH APPLICATION ICON | ENABLED | ENABLED |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-186521 filed Sep. 26, 2016.

BACKGROUND

(i) Technical Field

The present invention relates to an information processing apparatus and a non-transitory computer readable medium.

(ii) Related Art

There has been provided an information processing apparatus in which an icon corresponding to an application program (hereinafter abbreviated as an application) for implementing a certain function is displayed on a screen and selected, and in which the application corresponding to the selected icon is activated to implement a specific function.

There is a known technique in which icons corresponding to applications that are less likely to be used are hidden from a screen, and in which, when an icon is selected from a list of icons that have been subjected to the hiding operation, the selected icon is displayed again on the screen.

SUMMARY

According to an aspect of the invention, there is provided an information processing apparatus including a display, an instruction receiving unit, and a controller. The display displays a screen containing a fundamental icon and an associated icon. The fundamental icon is an icon for selecting execution of a certain function. The associated icon is associated with the fundamental icon. The instruction receiving unit receives an instruction to delete an icon displayed on the screen by the display. The controller exerts control in such a manner that, when the icon is the fundamental icon, the instruction receiving unit does not delete the fundamental icon.

BRIEF DESCRIPTION OF THE DRAWINGS

Exemplary embodiments of the present invention will be described in detail based on the following figures, wherein:

FIGS. 12A and 12B are diagrams for describing how to generate a one-touch application;

FIG. 19 is a diagram illustrating a table describing available operations according to icon types;

DETAILED DESCRIPTION

Figure 1:
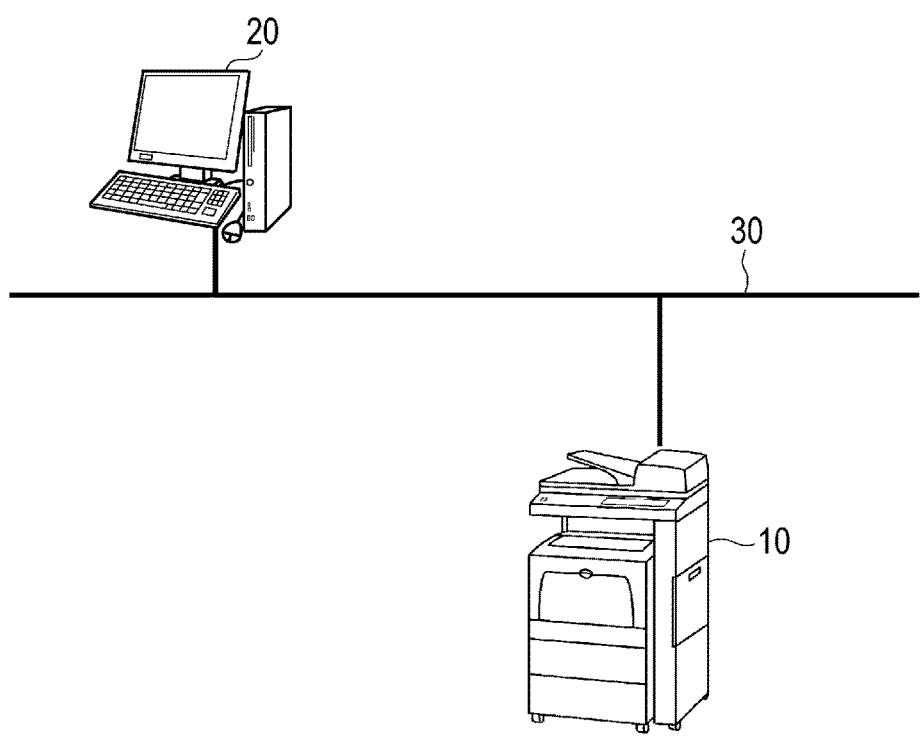
FIG. 1 is a diagram illustrating the configuration of an image forming system including an image forming apparatus that serves as an information processing apparatus according to an exemplary embodiment of the present invention.

Exemplary embodiments of the present invention will be described in detail by referring to the drawings.

FIG. 1 is a diagram illustrating the configuration of an image forming system including an image forming apparatus 10 that serves as an information processing apparatus according to an exemplary embodiment of the present invention.

As illustrated in FIG. 1, the image forming system according to the exemplary embodiment includes the image forming apparatus 10 and a terminal apparatus 20 that are connected to each other through a network 30. The terminal apparatus 20 generates print data, and transmits the generated print data to the image forming apparatus 10 over the network 30. The image forming apparatus 10 receives the print data transmitted from the terminal apparatus 20, and outputs an image according to the print data on a sheet. The image forming apparatus 10 is a so-called multifunction device having multiple functions, such as a print function, a scanning function, a copying function, and a faxing function.

Figure 2:
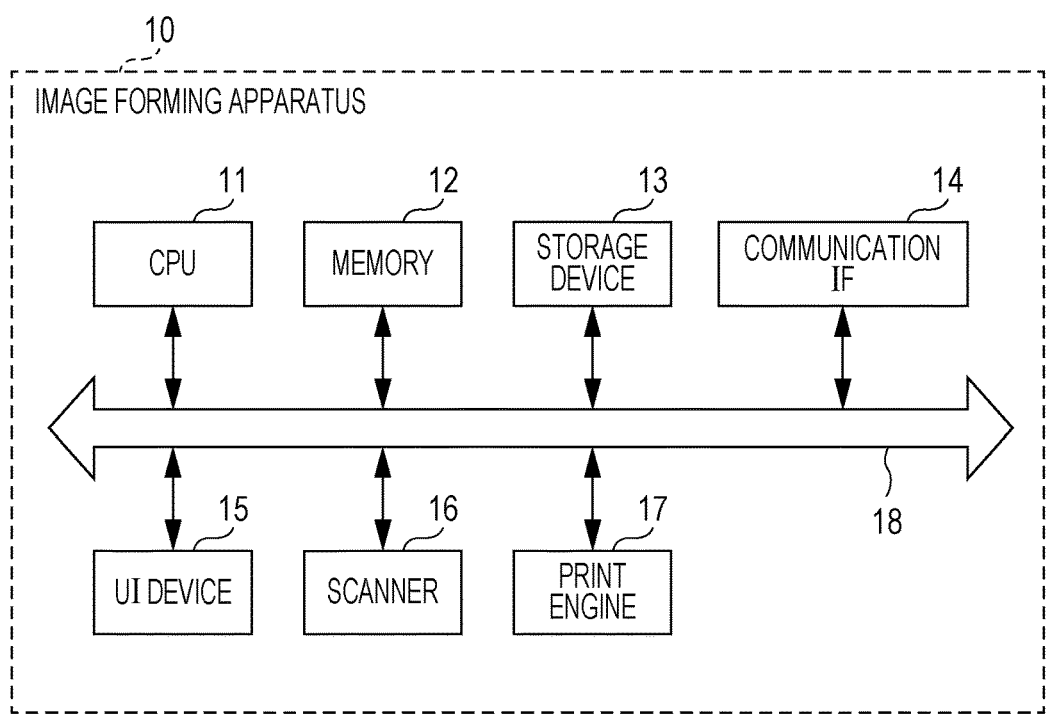
FIG. 2 is a block diagram illustrating the hardware configuration of the image forming apparatus according to the exemplary embodiment of the present invention.

FIG. 2 is the hardware configuration of the image forming apparatus 10 in the image forming system according to the exemplary embodiment.

As illustrated in FIG. 2, the image forming apparatus 10 includes a CPU 11, a memory 12, a storage device 13 such as a hard disk drive (HDD), a communication interface (IF) 14 that receives/transmits data from/to an external apparatus and the like over the network 30, a user interface (UI) device 15 including a touch panel or a liquid-crystal display and a keyboard, a scanner 16, and a print engine 17. These components are connected to one another through a control bus 18.

The print engine 17 prints an image on a recording medium such as a print sheet through processes, such as charging, exposure to light, developing, transfer, and fixing.

The CPU 11 performs given processes on the basis of control programs stored in the memory 12 or the storage device 13, and controls operations performed by the image forming apparatus 10. In the exemplary embodiment, the description is made by taking the case in which the CPU 11 reads control programs stored in the memory 12 or the storage device 13 and executes the control programs. However, the programs may be provided to the CPU 11 by storing the programs in a storage medium such as a compact disc-read-only memory (CD-ROM).

Figure 3:
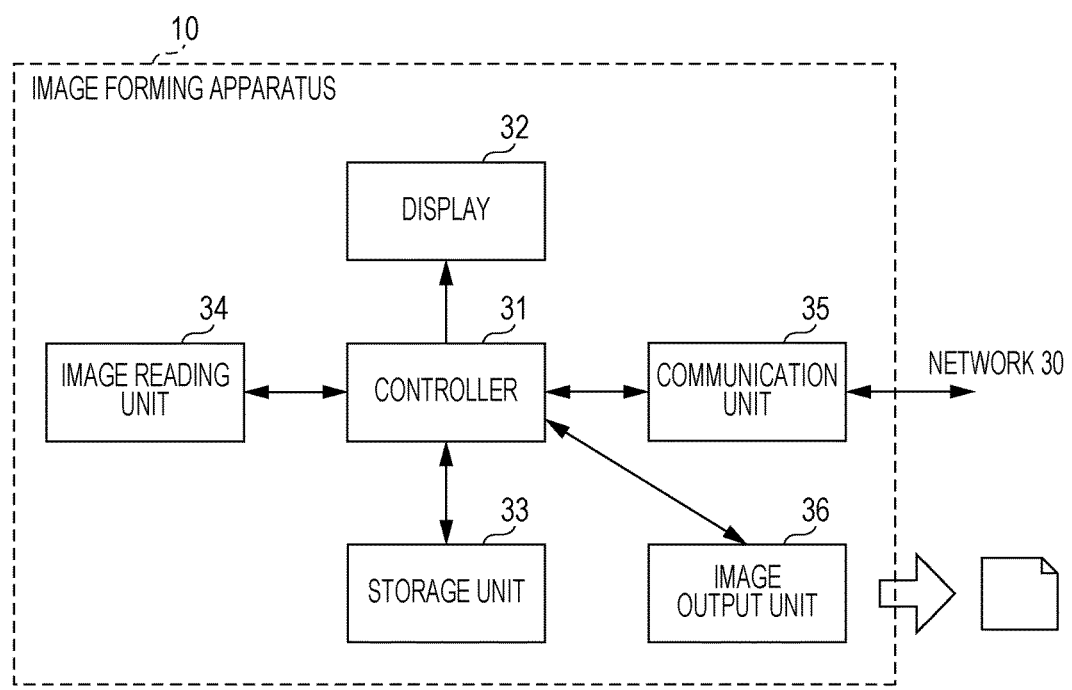
FIG. 3 is a block diagram illustrating the functional configuration of the image forming apparatus according to the exemplary embodiment of the present invention.

FIG. 3 is a block diagram illustrating the functional configuration of the image forming apparatus 10 which is implemented through execution of the control programs.

As illustrated in FIG. 3, the image forming apparatus 10 according to the exemplary embodiment includes a controller 31, a display 32, a storage unit 33, an image reading unit 34, a communication unit 35, and an image output unit 36.

The display 32 that includes an operation panel such as a so-called touch panel receives operations performed on the image forming apparatus 10, and displays an operation result, a processing result, and the like to present the results to a user. The display 32 displays an operation screen containing a fundamental icon for selecting execution of a certain function, and an associated icon associated with the fundamental icon.

A fundamental icon is an icon for activating an application or program for performing a fundamental function of the image forming apparatus 10, such as copying, scanning, facsimile transmission, device setting, or authentication setting. An associated icon is an icon generated in association with a fundamental icon, such as a one-touch application icon generated on the basis of a fundamental icon.

The storage unit 33 is a memory for temporarily storing image data and the like obtained during a process performed by the controller 31.

The image reading unit 34 reads a document that has been set, and converts the document into image data.

The communication unit 35 receives the source of data from an external apparatus such as the terminal apparatus 20. For example, the communication unit 35 receives a print job from the terminal apparatus 20, transmits image data through a facsimile, and transmits/receives electronic mail.

The image output unit 36 performs operations on the basis of instructions from the controller 31, and prints, for output, image data on a recording medium such as a print sheet.

The controller 31 controls the display 32, the storage unit 33, the image reading unit 34, the communication unit 35, the image output unit 36, and the like, and performs various processes, such as a print process, a copying process, and a process of reading a document image.

When the controller 31 receives an instruction to delete an icon displayed by the display 32 on a screen, in the case where the icon for which the delete instruction is received is a fundamental icon, the controller 31 exerts control so that the fundamental icon for which the delete instruction is received is not deleted. In the case where the icon for which the delete instruction is received is an associated icon, the controller 31 exerts control so that the associated icon for which the delete instruction is received is deleted.

In the case where the icon for which the delete instruction is received is a fundamental icon, the controller 31 exerts control so that the fundamental icon for which the delete instruction is received is hidden instead of being deleted.

An associated icon for a one-touch application or the like is associated with setting values that are set in advance by a user. The setting values are set on the basis of values that are input on a screen displayed by selecting a fundamental icon.

When an icon for which a delete instruction is received is to be deleted, the controller 31 exerts control so that an application for a function performed through selection of the icon, and various types of data such as customization information are deleted from the image forming apparatus 10 in which the controller 31 operates.

When an icon for which a delete instruction is received is an associated icon, the controller 31 makes a user select whether the associated icon for which the delete instruction is received is to be deleted or hidden. On the basis of the user selection, the controller 31 exerts control so that the associated icon is deleted or hidden.

The controller 31 causes information about hidden fundamental icons and hidden associated icons to be stored in the storage unit 33, and causes the display 32 to display again a fundamental icon or an associated icon for which a display instruction has been received.

Fundamental icons include an icon corresponding to an application installed in advance in the image forming apparatus 10. Fundamental icons also include an icon corresponding to an application that is not capable of being activated only with settings which are set by a user, once the application is deleted. Fundamental icons further include an icon corresponding to an application for which a charge is imposed to install the application in the image forming apparatus 10.

Associated icons include an icon associated with a series of processes, that is, associated with a flow of processes.

In the image forming apparatus 10 according to the exemplary embodiment, a folder icon in which multiple icons may be stored may be used so that the multiple icons are collectively displayed on an operation screen.

When such a folder icon is used to collect multiple icons, an instruction to delete the multiple icons at a time may be given.

In this case, the controller 31 receives an instruction to delete multiple icons displayed on a screen. When the multiple icons for which the delete instruction is received include fundamental icons, the controller 31 causes the fundamental icons to be hidden instead of being deleted. The controller 31 deletes associated icons that are icons other than the fundamental icons, among the multiple icons for which the delete instruction is received.

Figure 4:
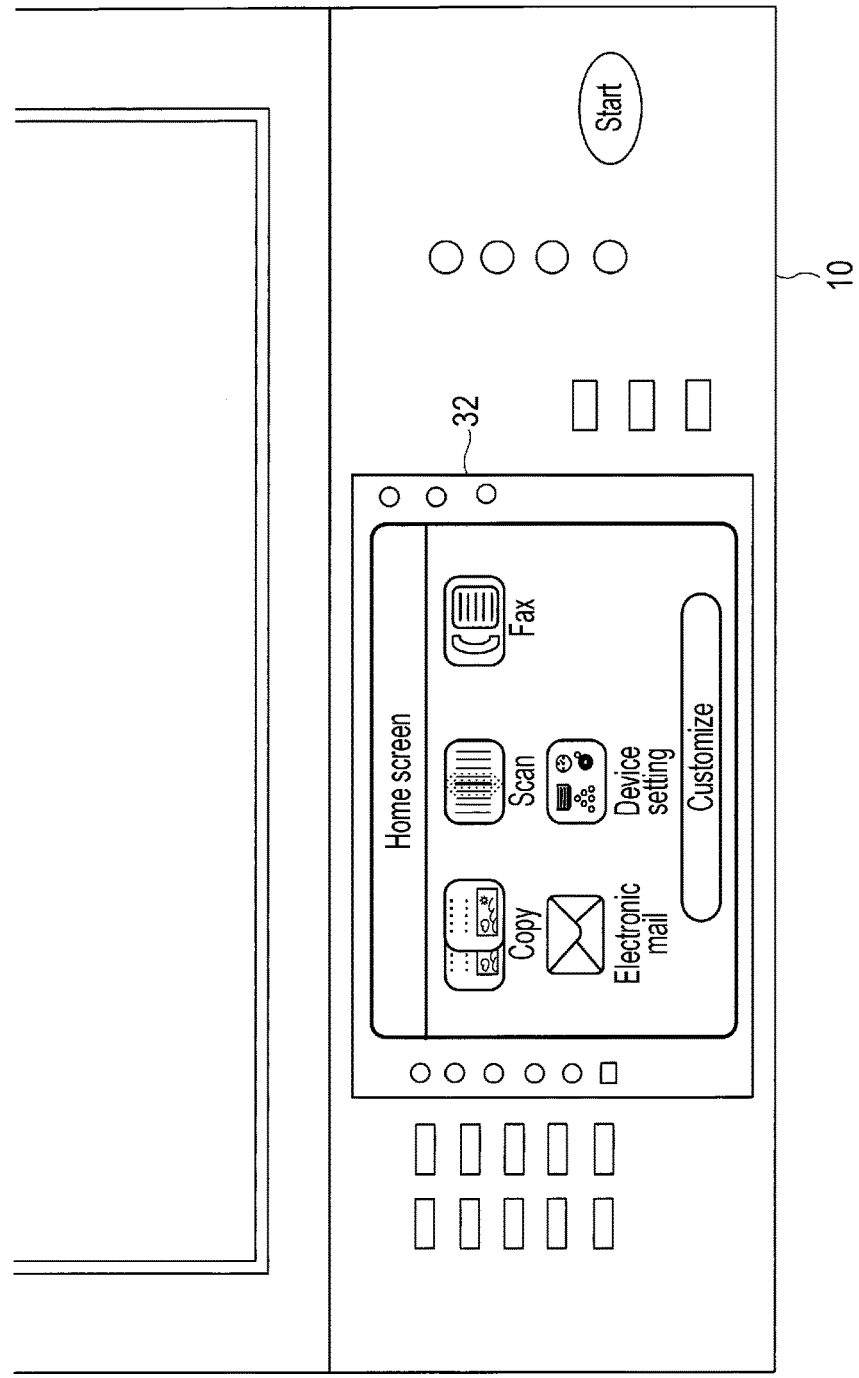
FIG. 4 is a diagram illustrating exemplary information displayed on a display of the image forming apparatus according to the exemplary embodiment of the present invention.

Information displayed on the display 32 of the image forming apparatus 10 according to the exemplary embodiment will be described. FIG. 4 illustrates exemplary information displayed on the display 32 of the image forming apparatus 10 according to the exemplary embodiment.

Figure 5:
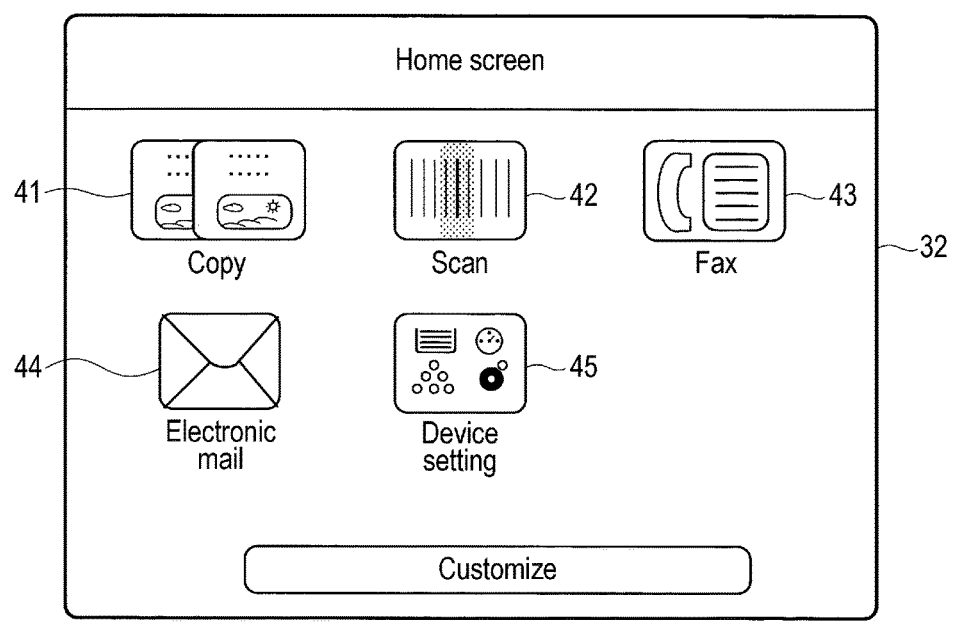
FIG. 5 is an enlarged view of information displayed on a home screen illustrated in FIG. 4.

FIG. 4 illustrates a case in which a home screen indicating the waiting state of the image forming apparatus 10 is displayed on the display 32. FIG. 5 is an enlarged view of information displayed on the home screen.

The exemplary home screen illustrated in FIG. 5 indicates a state in which multiple icons 41 to 45 for selecting execution of certain functions are displayed on an operation screen on the display 32.

For example, the icon 41 is an icon for selecting execution of a copying function. A user touches the icon with their finger and selects the icon so that a copy application program is activated and the user uses the copying function.

Similarly, the icons 42 to 45 are used for performing a scanning function, a faxing function, an electronic-mail receiving/transmitting function, and a device setting function, respectively.

An icon is a decorative graphic that is displayed on an operation screen and that is used to activate a specific application program (hereinafter abbreviated as an application) and to indicate a position at which an operation for making a transition to a specific screen is performed. The decorative graphic not only may be a figure having just a design but also may include various types of characters, such as an alphabet, a Hiragana character, a Katakana character, and a Chinese character.

The icons 41 to 45 illustrated in FIG. 5 are fundamental icons for performing fundamental functions of the image forming apparatus 10. If a fundamental icon is deleted and the application corresponding to the fundamental icon is deleted, the application is not activated through just settings that are set by a user.

In the image forming apparatus 10 according to the exemplary embodiment, other than the applications corresponding to fundamental functions, a one-touch application obtained by customizing a function for each user may be generated.

How to generate such a one-touch application will be described by referring to FIGS. 6 to 13.

Figure 6:
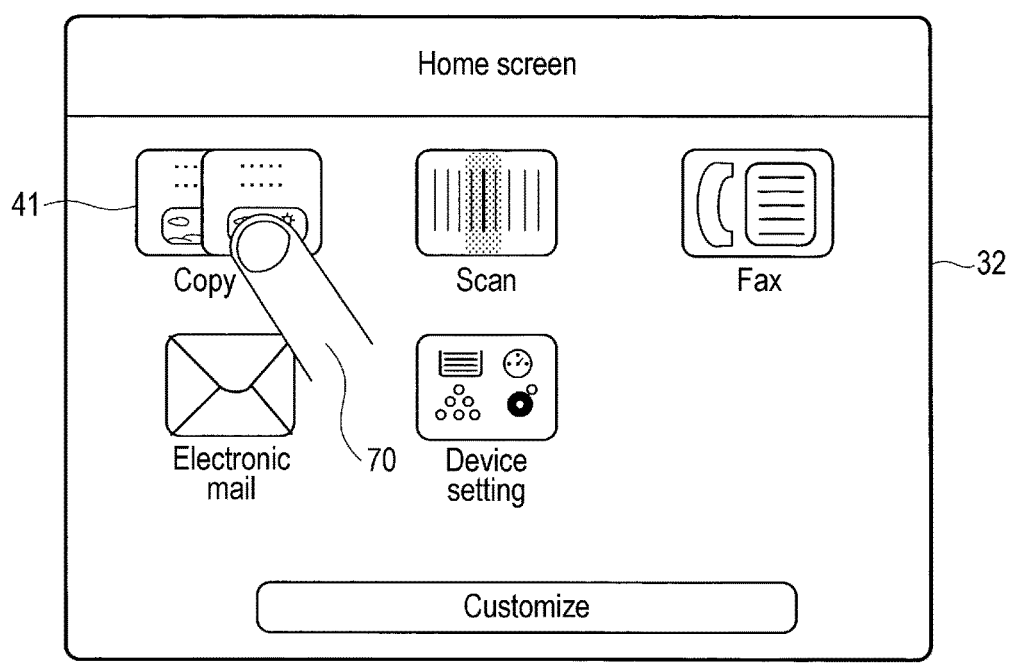
FIG. 6 is a diagram for describing how to generate a one-touch application.

First, a user selects an icon for a fundamental function for which a one-touch application is to be generated. In this example, as illustrated in FIG. 6, a description will be made under the assumption that a user has selected the icon 41 corresponding to the copying function by using a finger 70.

Figure 7:
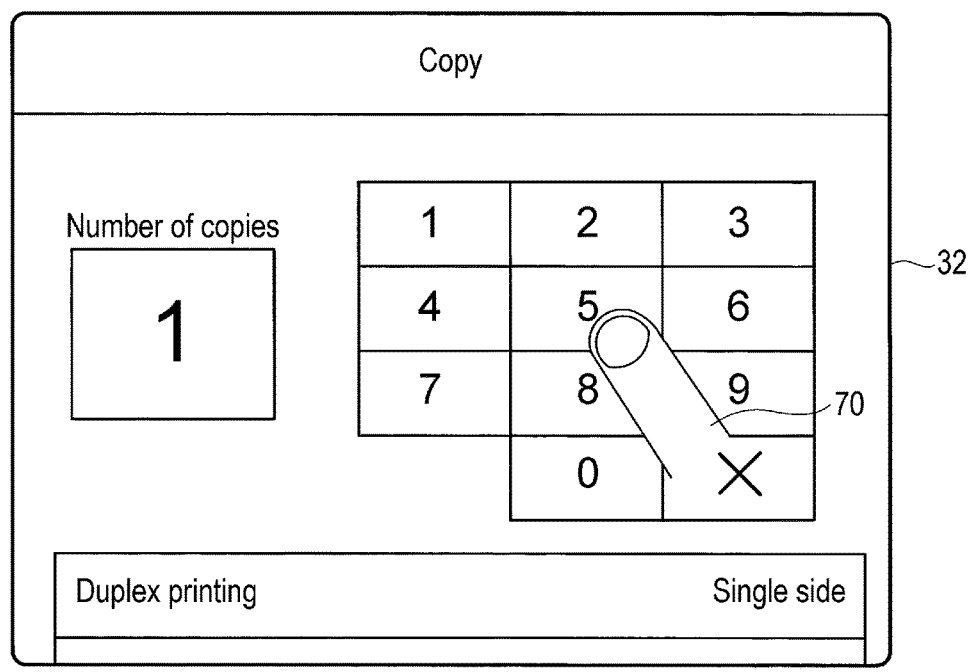
FIG. 7 is a diagram for describing how to generate a one-touch application.

A user selects the icon 41 corresponding to the copying function so that a screen on which setting values for various setting items for the copying function are input as illustrated in FIG. 7 is displayed. FIG. 7 illustrates a case in which an operation of setting the number of copies to "5" is performed.

Figure 8:
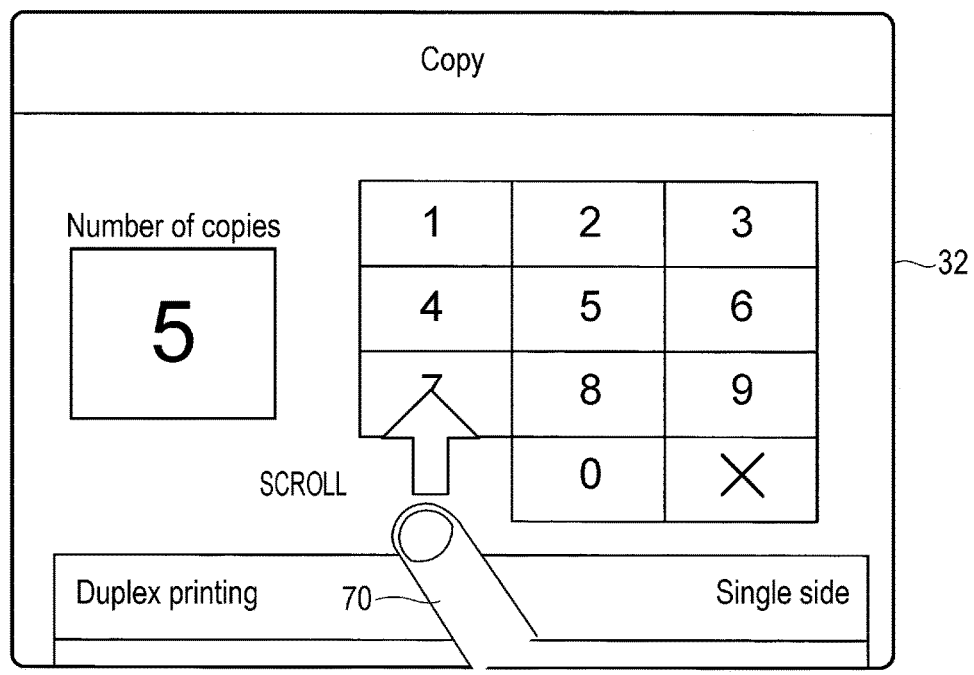
FIG. 8 is a diagram for describing how to generate a one-touch application.

The operation screen for copying includes a region in which various setting values are input, other than the region displayed on the display 32. Therefore, as illustrated in FIG. 8, the user uses the finger 70 to move the operation screen in the upward direction so as to scroll the screen and display a lower region of the screen which is used for settings items.

Figure 9:
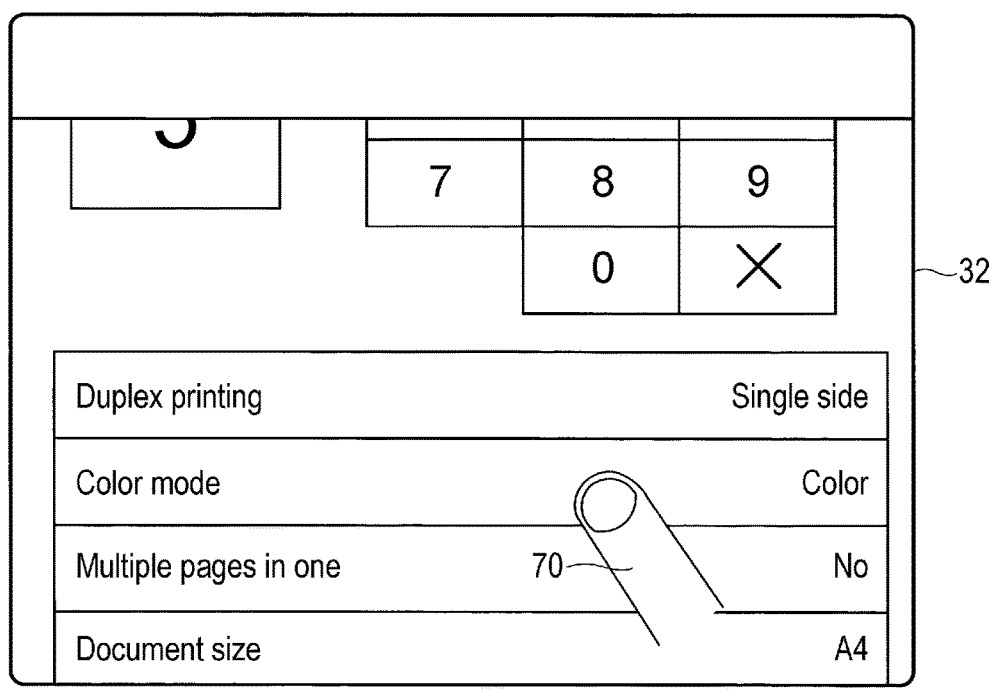
FIG. 9 is a diagram for describing how to generate a one-touch application.

As illustrated in FIG. 9, the user operates other settings items except the number of copies so that setting values that are to be set as a one-touch application are input.

Figure 10:
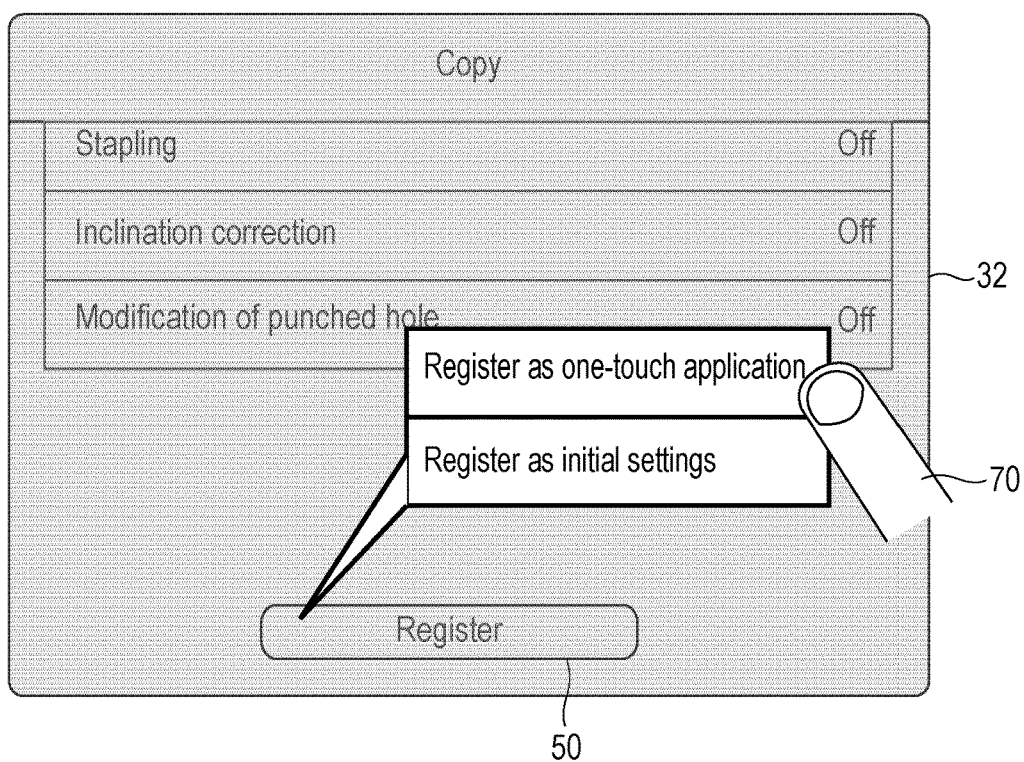
FIG. 10 is a diagram for describing how to generate a one-touch application.

After input of various setting values is finished in the above-described way, when the user operates a registration button 50 on which "Register" is written as illustrated in FIG. 10, a selection screen for registering the input setting values is displayed. Since the user is going to generate a one-touch application, the user selects an option of "Register as one-touch application" from the displayed options.

Figure 11:
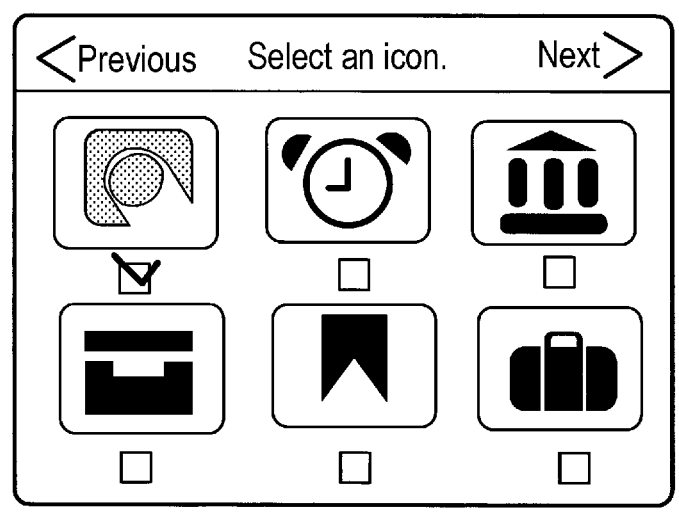
FIG. 11 is a diagram for describing how to generate a one-touch application.

As illustrated in FIG. 11, a selection screen for selecting an icon shape is displayed on the display 32. In the selection screen for selecting an icon shape, the shape of the one-touch application icon that is to be generated may be selected at a user's request.

After the shape of the one-touch application icon is selected, an execution mode is selected as illustrated in FIG. 12A. Two execution mode, the "immediate-execution mode" and the "execution-after-confirmation mode", may be selected. The "immediate-execution mode" is an execution mode in which, when a one-touch application icon is selected, the one-touch application corresponding to the one-touch application icon is immediately activated and performed. The "execution-after-confirmation mode" is an execution mode in which the following operations are performed. When a one-touch application icon is selected, instead of immediate execution of the one-touch application corresponding to the one-touch application icon, some confirmation screen is first presented to a user, and, when the user gives an instruction to activate the one-touch application, the one-touch application is then activated.

In the screen illustrated in FIG. 12A, a case in which the "execution-after-confirmation mode" is selected is illustrated.

When the "execution-after-confirmation mode" is selected, a screen, as illustrated in FIG. 12B, on which a sentence that is to be presented to a user on a confirmation screen is input is displayed on the display 32.

In FIG. 12B, a case in which a sentence of "Set a document and press 'Start button'." has been input is illustrated.

The fundamental application (source application for generation: parent application) for the one-touch application that is now being generated is a copying function application. Therefore, a wording of "Start button" has been input in the initial state. If the fundamental application corresponding to the one-touch application that is now being generated is an electronic-mail function application, a wording of "Transmit button" is input in the initial state. That is, according to the type of a fundamental application from which a one-touch application is generated, a predetermined wording is input in the initial state.

Figure 13:
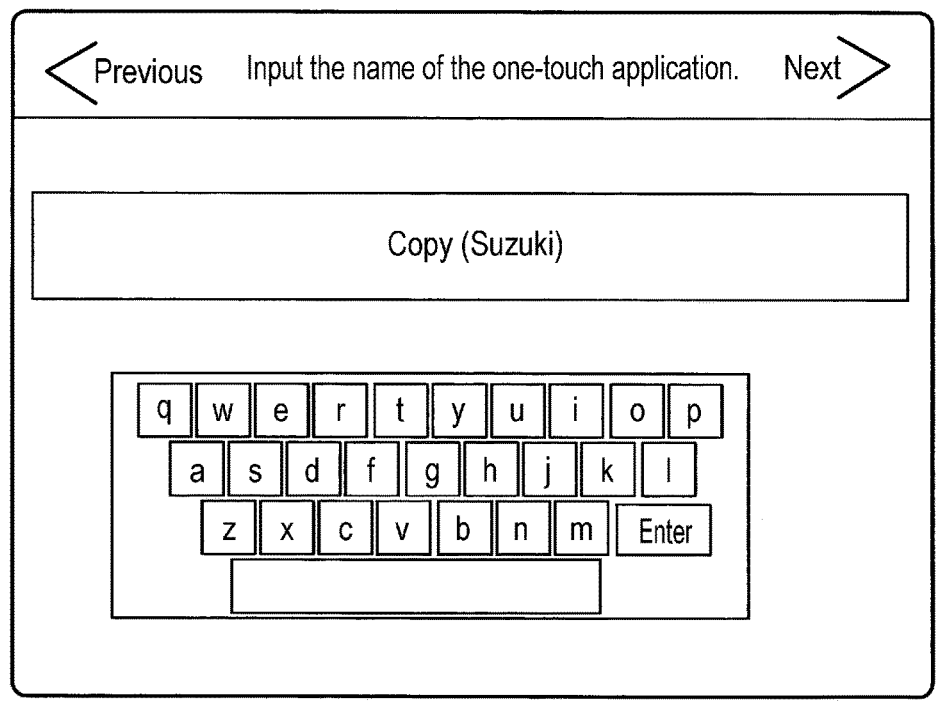
FIG. 13 is a diagram for describing how to generate a one-touch application.

When input of a sentence displayed on the confirmation screen is completed, a name input screen for the one-touch application which is illustrated in FIG. 13 is displayed.

The name input screen illustrated in FIG. 13 is a screen on which the name of the one-touch application that is being generated is input. In the exemplary screen illustrated in FIG. 13, a case in which a name of "Copy (Suzuki)" has been input as the name of the one-touch application is illustrated.

Figure 14:
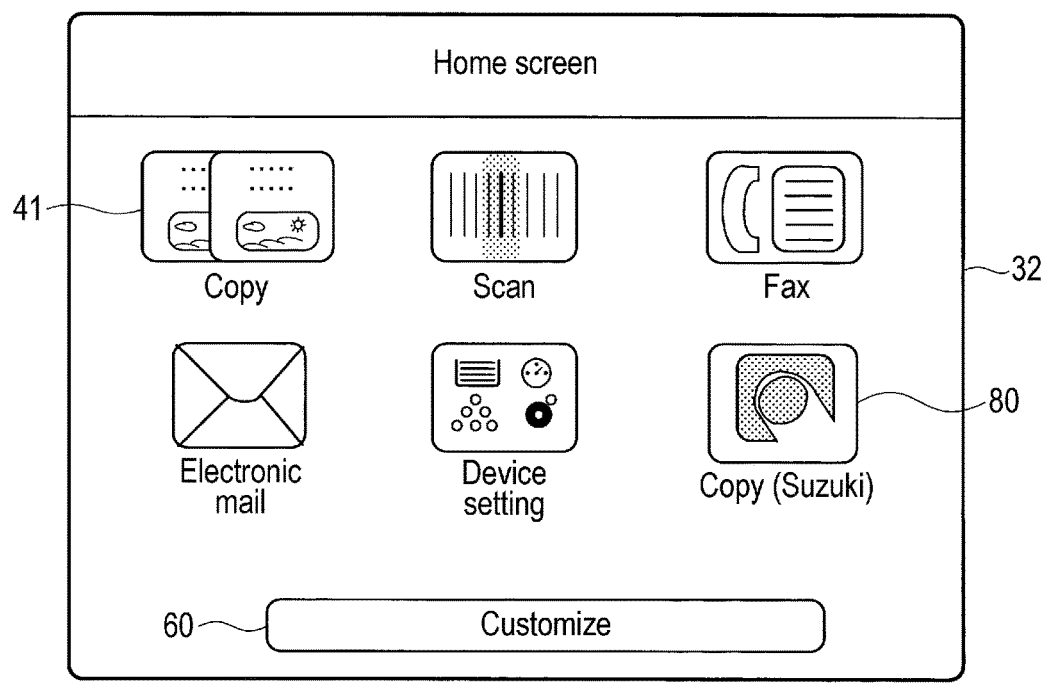
FIG. 14 is a diagram illustrating an exemplary home screen obtained after generation of a one-touch application.

When a one-touch application has been generated by using the way described by using FIGS. 6 to 13, a one-touch application icon 80 corresponding to the generated one-touch application is added on the operation screen on the display 32 as illustrated in FIG. 14.

A user selects the one-touch application icon 80 so that the copying function may be performed on the basis of setting values that are input in advance by the user. Setting values that are frequently used are set as a one-touch application in advance, achieving a decreased number of operations of changing setting values.

A case in which a customization process of changing information displayed on the exemplary home screen as illustrated in FIG. 14 is performed will be described.

In the image forming apparatus 10 according to the exemplary embodiment, the position at which each of the icons 41 to 45 and the one-touch application icon 80 on the display 32 is operated may be moved. However, if a large number of icons are displayed on an operation screen, a necessary icon is to be searched for among the large number of icons, resulting in degradation in operability. Therefore, when a generated one-touch application icon is unnecessary, the unnecessary one-touch application icon may be deleted, or icons that are not frequently used are hidden so that such icons may disappear from the operation screen.

Figure 15:
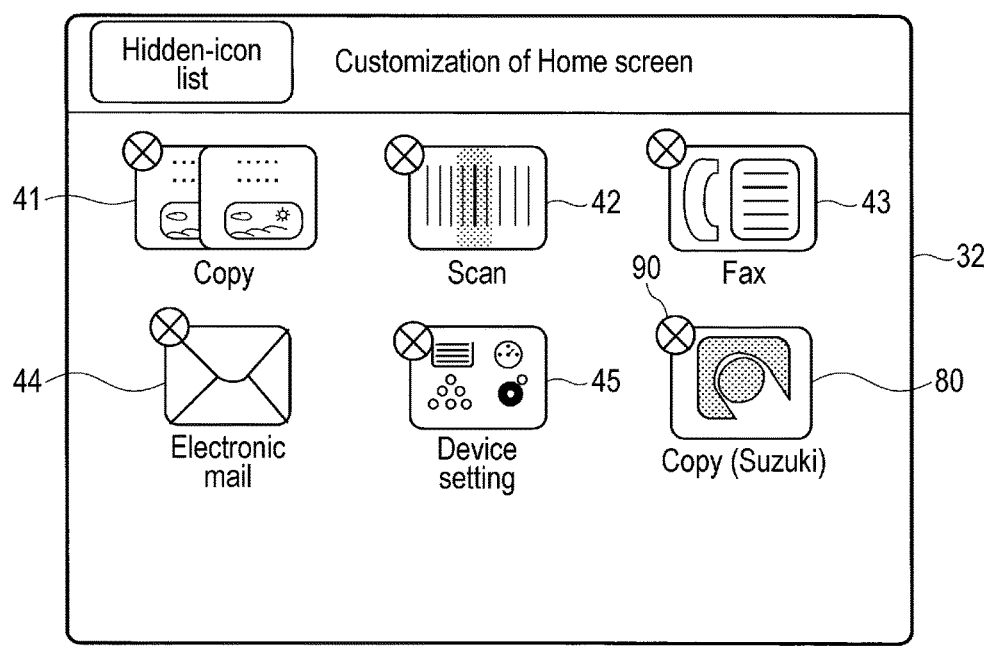
FIG. 15 is a diagram illustrating a customization screen displayed through an operation performed on a customization button.

For example, when a user operates a customization button 60 on the exemplary home screen illustrated in FIG. 14, a customization screen as illustrated in FIG. 15 is displayed.

In the customization screen illustrated in FIG. 15, a Delete button 90 is displayed in a left end portion of each of the icons 41 to 45 and the one-touch application icon 80.

When the Delete buttons 90 of the icons 41 to 45 that are fundamental icons are operated, the icons 41 to 45 disappear from the operation screen and are hidden. However, the applications corresponding to the hidden icons are not deleted from the system of the image forming apparatus 10, and may be displayed again on the operation screen by using a way described below.

Figure 16:
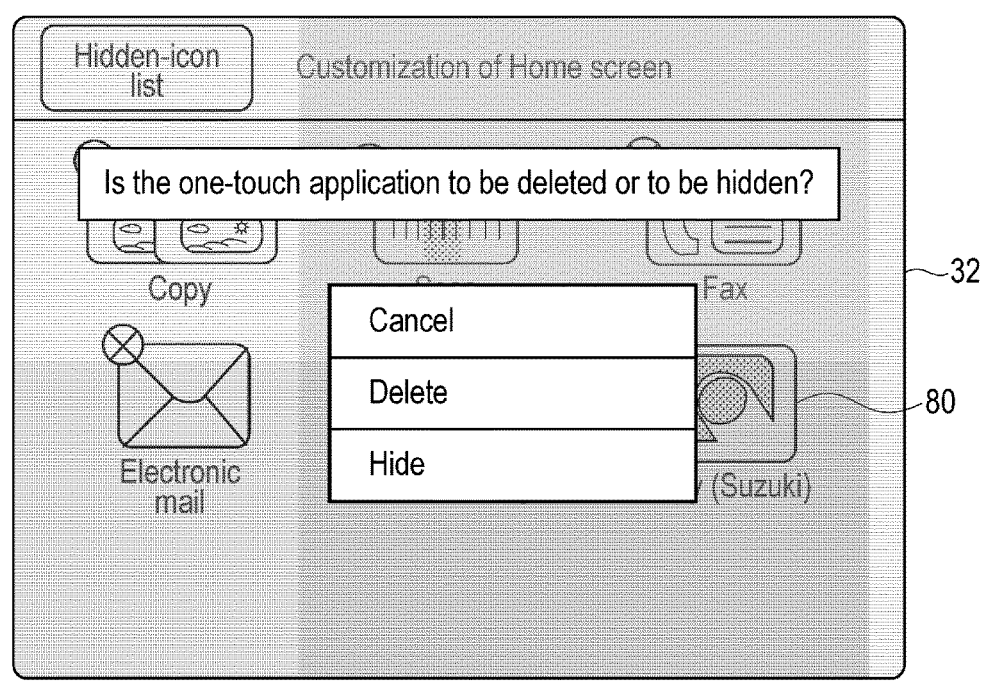
FIG. 16 is a diagram illustrating information displayed when a Delete button of a one-touch application icon is operated.

When the Delete button 90 of the one-touch application icon 80 generated by a user is operated, information is displayed on the display 32 as illustrated in FIG. 16.

On the operation screen illustrated in FIG. 16, options of deletion of the one-touch application, hiding of the one-touch application, and canceling of the process of deleting the one-touch application are illustrated.

When a user selects "Delete", the one-touch application icon 80 is deleted from the operation screen, and the one-touch application corresponding to the one-touch application icon 80 and all of data such as customization information associated with the one-touch application are deleted. The data will not be used again.

That is, when a user selects deletion of the one-touch application icon, the one-touch application itself is deleted. When the same one-touch application is necessary again, a one-touch application needs to be generated by inputting desired setting values sequentially by using the way described above.

On the operation screen illustrated in FIG. 16, when a user selects "Hide", the one-touch application icon 80 disappears from the operation screen, but the one-touch application corresponding to the one-touch application icon 80 and data such as customization information associated with the one-touch application are left as they are. The hidden one-touch application icon 80 may be displayed again on the operation screen by using the way described below.

An operation for displaying, again on the operation screen, an icon that has been hidden by using the way described above will be described.

Figure 17:
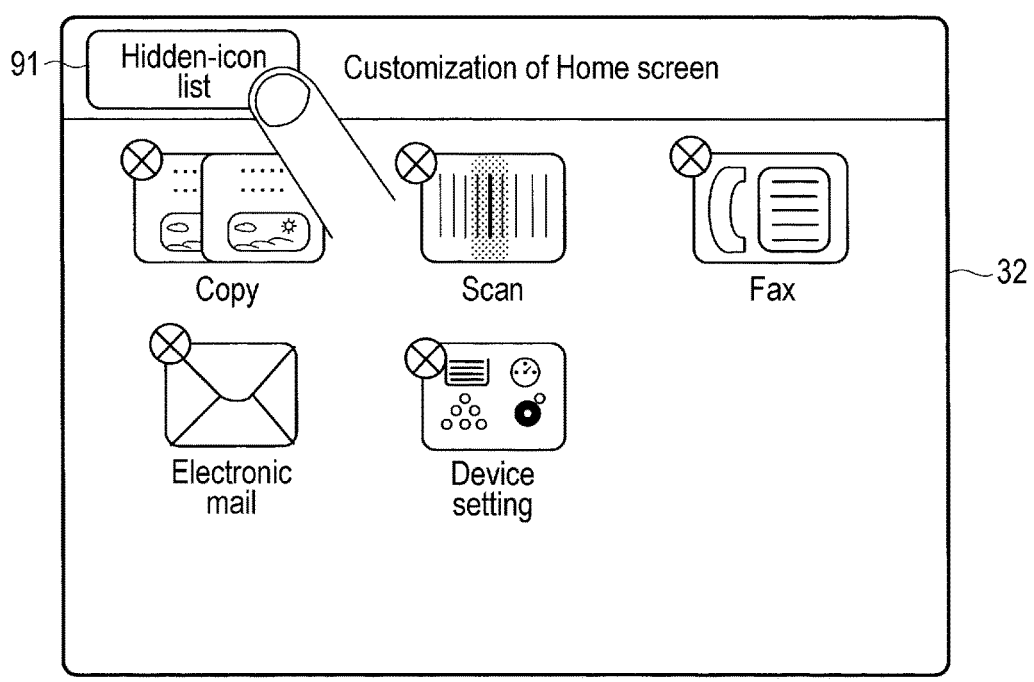
FIG. 17 is a diagram for describing an operation performed when an icon that has been hidden is to be displayed again on an operation screen.

When a hidden icon is to be displayed again on the operation screen, a "hidden-icon list button" 91 is operated in the customization screen as illustrated in FIG. 17.

Figure 18:
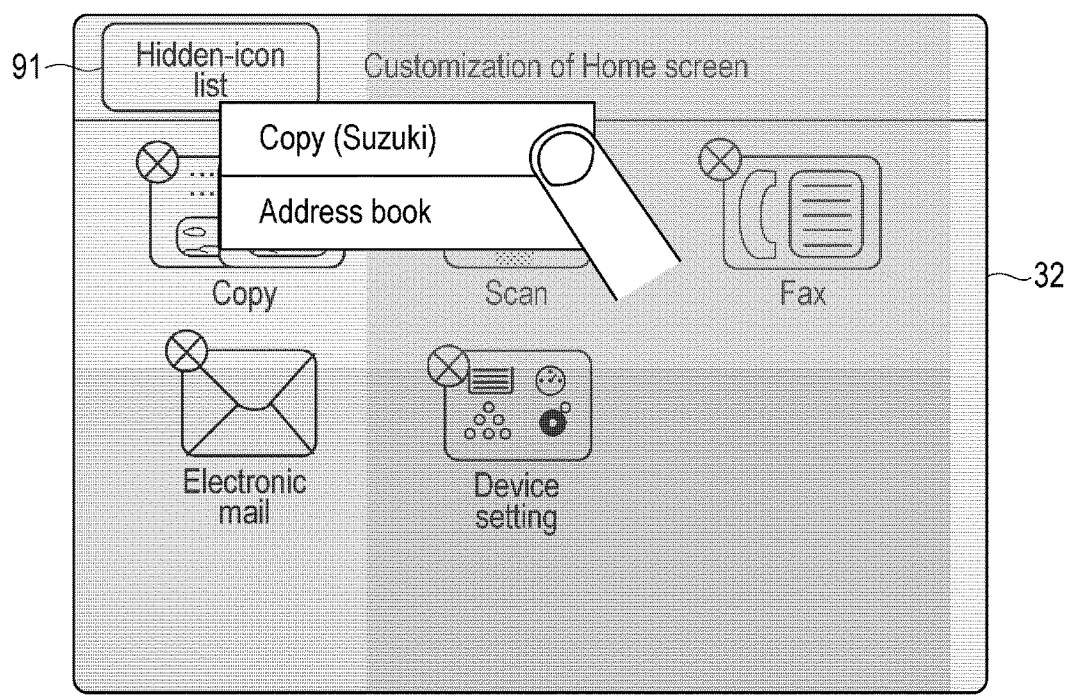
FIG. 18 is a diagram illustrating a display screen displayed when a "hidden-icon list button" is operated on the customization screen.

Then, an operation screen as illustrated in FIG. 18 is displayed, and a list of icons that have been hidden is displayed. The operation screen illustrated in FIG. 18 indicates a case in which the one-touch application icon of "Copy (Suzuki)" and a fundamental icon of "Address book" have been hidden by using the way described above.

When a user selects an icon that is to be displayed again, from the hidden icon list, the selected icon is displayed again on the operation screen.

That is, in the image forming apparatus 10 according to the exemplary embodiment, as illustrated in FIG. 19, even when an instruction to delete a fundamental icon for performing a fundamental function is given, the fundamental icon may be subjected only to a hiding process, not to a deletion process.

In contrast, a one-touch application icon (associated icon) associated with a fundamental icon may be subjected to either of a deletion process and a hiding process.

An operation performed in the case where multiple icons are collectively displayed by using a folder icon, when an instruction to delete the folder icon is given will be described.

Figure 20:
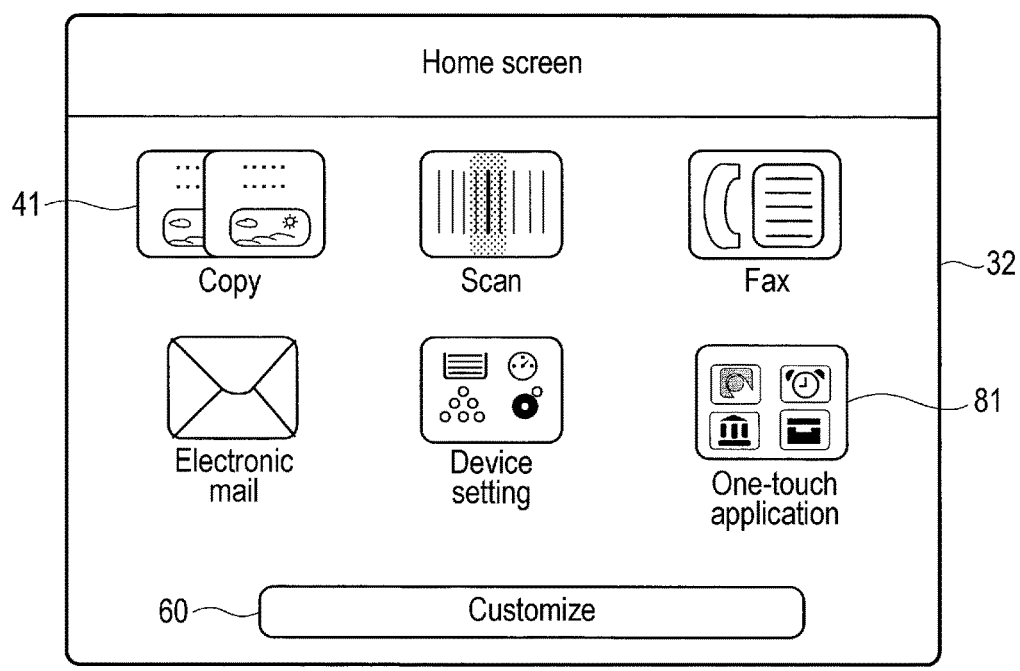
FIG. 20 is a diagram illustrating an exemplary home screen obtained when multiple one-touch applications are stored in a folder icon.

For example, the operation screen illustrated in FIG. 20 indicates a state in which a folder icon 81 is used to display multiple one-touch applications collectively.

Figure 21:
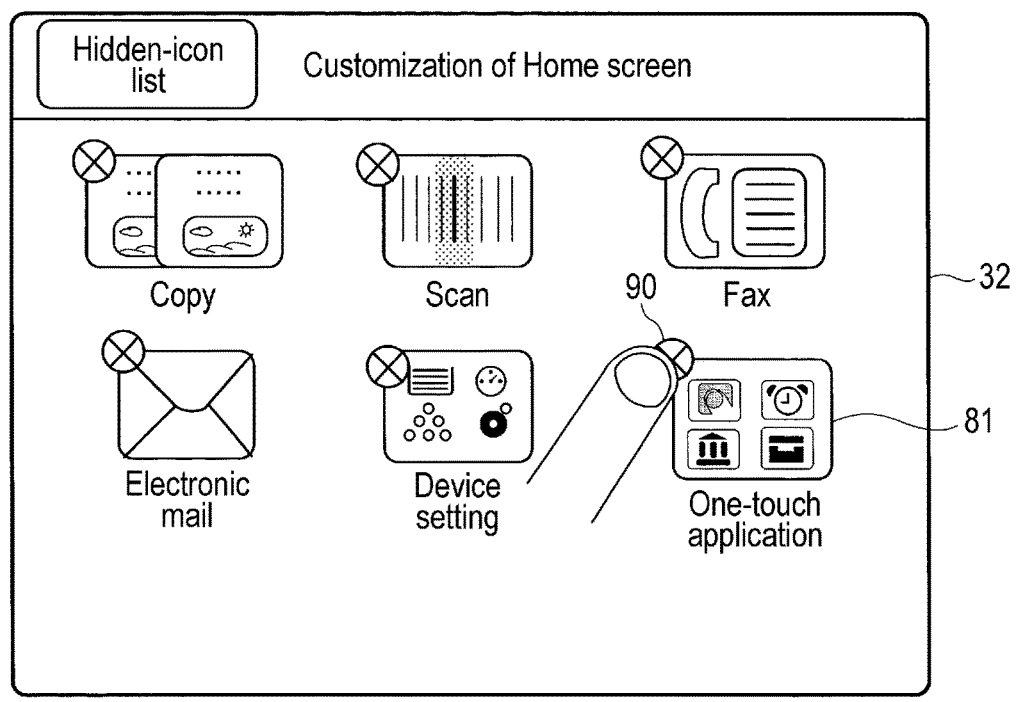
FIG. 21 is a diagram illustrating a customization screen displayed by operating a customization button on the operation screen illustrated in FIG. 20.

In this state, when the customization button 60 is operated, a customization screen as illustrated in FIG. 21 is displayed. On the customization screen illustrated in FIG. 21, a Delete button 90 is displayed in a left end portion of the folder icon 81. The Delete button 90 is operated so that an instruction to delete the folder icon 81 is given.

Figure 22:
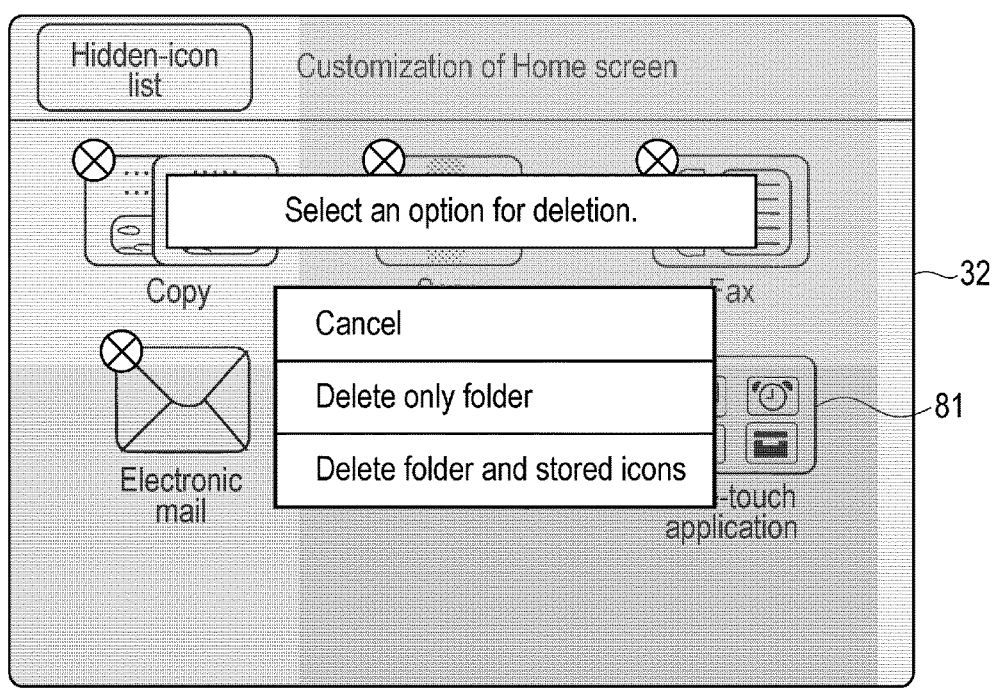
FIG. 22 is a diagram illustrating a confirmation screen displayed when an instruction to delete the folder icon is given.

When an instruction to delete the folder icon 81 is given, a confirmation screen as illustrated in FIG. 22 is displayed. In this case, the folder icon 81 for which the deletion instruction is given is not empty. Therefore, options of deletion of only the folder, deletion of the folder and the icons contained in the folder, and canceling of the delete instruction are illustrated.

In the case where a user selects deletion of only the folder, the icons stored in the folder icon 81 are separately displayed on the home screen.

When an instruction to delete an empty folder icon that does not contain any icon is given, the folder icon is deleted without presenting a confirmation screen to a user.

Figure 23:
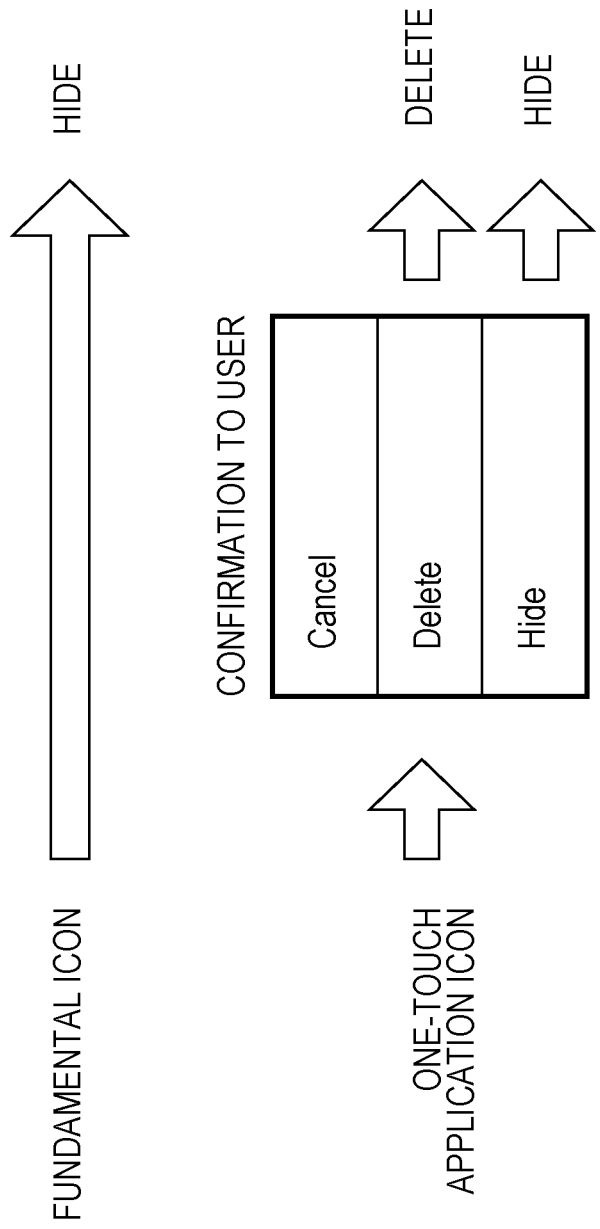
FIG. 23 is a diagram for describing processes that correspond to the types of icons stored in the folder icon, and that are performed when an instruction to delete the folder icon is given.

On the confirmation screen illustrated in FIG. 22, when a user selects a button of "Delete folder and stored icons", if an icon stored in the folder icon 81 is a fundamental icon, the icon is hidden as illustrated in FIG. 23.

When a user selects a button of "Delete folder and stored icons", if the folder icon 81 contains an associated icon, a confirmation screen for selecting "Delete" or "Hide" is presented again to the user.

When the user selects "Delete", the associated icon stored in the folder icon 81 is deleted. If the user selects "Hide", the associated icon stored in the folder icon 81 is hidden.

In the exemplary embodiment, the description is made by taking a one-touch application icon generated by a user, as an exemplary associated icon associated with a fundamental icon. An associated icon is not limited to an icon generated by a user. An application installed in advance in the apparatus before delivery to a user may correspond to an associated icon.

The icon type that is regarded as a fundamental icon and the icon type that is regarded as an associated icon are not limited to the icon types according to the exemplary embodiment described above. For example, an icon corresponding to an application that is easily installed from the outside may be regarded as an associated icon that may be deleted, and an icon corresponding to an application that is difficult to install again from the outside may be regarded as a fundamental icon that is impossible to delete. Alternatively, an icon corresponding to an application downloaded after charging may be regarded as a fundamental icon that is impossible to delete. Further, an icon corresponding to an application for which downloading or reinstallation takes time because of a large volume of data may be also regarded as a fundamental icon that is impossible to delete.

In the exemplary embodiment, when the home screen is to be customized, a Delete button 90 is displayed in a left upper portion of each of the icons 41 to 45 that are fundamental icons and the one-touch application icon 80 that is an associated icon. In the exemplary embodiment, even when the Delete buttons 90 of the icons 41 to 45 that are fundamental icons are operated, the applications for the icons 41 to 45 are not deleted from the system.

However, the exemplary embodiment is not limited to such a configuration. Another configuration may be employed in which the Delete buttons 90 of the icons 41 to 45 that are fundamental icons are not displayed, and in which instructions to delete the icons 41 to 45 are not received. Yet another configuration may be employed in which the Delete buttons 90 of the icons 41 to 45 that are fundamental icons are displayed, but in which the Delete buttons 90 are displayed in such a manner that it is indicated that the delete operation is impossible to perform, for example, in grey-out display. In this manner, instructions to delete the icons 41 to 45 are impossible to receive.

Modified Examples

In the exemplary embodiment, the case in which the present invention is applied to an image forming apparatus is described. The present invention is not limited to this. The present invention is similarly applicable to various information processing apparatuses displaying icons on a screen, such as a smartphone, a tablet terminal apparatus, a cellular phone, and a notebook computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display that displays a screen containing: (i) a fundamental icon, the fundamental icon being an icon for selecting execution of a certain function; (ii) an associated icon, the associated icon being associated with the fundamental icon; and (iii) a folder icon in which a plurality of icons may be stored;
an instruction receiving unit that receives an instruction to delete an icon or a folder icon displayed on the screen by the display; and
a controller that exerts control to distinguish between the fundamental icon and the associated icon, wherein
when the icon is the fundamental icon, the fundamental icon for which the instruction to delete is received is not deleted, and data associated with the fundamental icon is not deleted, and instead, the fundamental icon for which the delete instruction is received is hidden,
when the icon is the associated icon, the controller exerts control such that the associated icon for which the instruction to delete is received is deleted, and data associated with the associated icon is deleted, based on user selection, and
when the instruction receiving unit receives an instruction to delete the folder icon and the plurality of icons stored in the folder icon, the controller exerts control such that:
each of the plurality of icons that is a fundamental icon is not deleted; and
each of the plurality of icons that is an associated icon is deleted, based on user selection.

2. The information processing apparatus according to claim 1,
wherein the associated icon is associated with a setting value that is set in advance by a user.

3. The information processing apparatus according to claim 2,
wherein the setting value is set on a basis of a value that is input on a screen displayed by selecting the fundamental icon.

4. The information processing apparatus according to claim 1, further comprising:
a redisplaying unit that stores information about a fundamental icon and an associated icon which have been hidden, and that displays again, on the display, a fundamental icon or an associated icon for which a redisplaying instruction is received.

5. The information processing apparatus according to claim 1,
wherein the fundamental icon indicates an application downloaded after charging.

6. A non-transitory computer readable medium storing a program causing a computer to execute a process comprising:
displaying a screen containing: (i) a fundamental icon, the fundamental icon being an icon for selecting execution of a certain function; (ii) an associated icon, the associated icon being associated with the fundamental icon; and (iii) a folder icon in which a plurality of icons may be stored;
receiving an instruction to delete an icon or a folder icon displayed on the screen; and
exerting control to distinguish between the fundamental icon and the associated icon, wherein
when the icon is the fundamental icon, the fundamental icon for which the instruction to delete is received is not deleted, and data associated with the fundamental icon is not deleted, and instead, the fundamental icon for which the delete instruction is received is hidden,
when the icon is the associated icon, the associated icon for which the instruction to delete is received is deleted, and data associated with the associated icon is deleted, based on user selection, and
when an instruction to delete the folder icon and the plurality of icons stored in the folder icon is received:
each of the plurality of icons that is a fundamental icon is not deleted; and
each of the plurality of icons that is an associated icon is deleted, based on user selection.

* * * * *